(12) United States Patent
Choi et al.

(10) Patent No.: US 8,666,061 B2
(45) Date of Patent: Mar. 4, 2014

(54) MOBILE DEVICE

(75) Inventors: Jae Seung Choi, Hwaseong-si (KR);
Hee Ryoul Choi, Seoul (KR); Dong Pil Choi, Suwon-si (KR); Hyun Woong Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 13/279,718

(22) Filed: Oct. 24, 2011

(65) Prior Publication Data
US 2012/0106201 A1 May 3, 2012

(30) Foreign Application Priority Data
Nov. 3, 2010 (KR) .......................... 10-2010-0108537

(51) Int. Cl.
*H04M 1/00* (2006.01)
*H04M 9/00* (2006.01)
*H04M 1/02* (2006.01)

(52) U.S. Cl.
CPC .......... *H04M 1/0202* (2013.01); *H04M 1/0266* (2013.01)
USPC ................................ 379/428.01; 379/433.04

(58) Field of Classification Search
USPC .......... 379/419, 428.01, 428.03, 434, 433.04;
345/173, 176, 177, 178; 455/550.1,
455/575.1, 575.8
See application file for complete search history.

(56) References Cited

U.S. PATENT DOCUMENTS

| 2010/0253485 A1 | 10/2010 | Park et al. |
| 2010/0265198 A1 | 10/2010 | Kondoh et al. |
| 2012/0062492 A1* | 3/2012 | Katoh .......................... 345/173 |

FOREIGN PATENT DOCUMENTS

| KR | 10-2008-0019384 A | 3/2008 |
| KR | 10-2010-0055131 A | 5/2010 |

* cited by examiner

*Primary Examiner* — Tuan D Nguyen
(74) *Attorney, Agent, or Firm* — Jefferson IP Law, LLP

(57) ABSTRACT

A mobile device is provided. The mobile device includes a panel assembly, a cover window and an adhesive tape. The panel assembly displays images and the cover window is mounted onto the panel assembly. The cover window protects the panel assembly and detects touches that occur thereon. The adhesive tape forms an open hole at the central portion to separate the cover window and the panel assembly. The adhesive tape adheres the cover window to the edge portion of the panel assembly. The adhesive tape further includes an air path part that provides an air passage for communicating an air chamber with the open hole. The air chamber fills with air. The mobile device can display images without a pooling phenomenon, and reduce the chance of malfunction when the user touches the panel assembly via the cover window.

8 Claims, 4 Drawing Sheets

MOBILE DEVICE

PRIORITY

This application claims the benefit under 35 U.S.C. §119 (a) of a Korean patent application filed on Nov. 3, 2010 in the Korean Intellectual Property Office and assigned Serial No. 10-2010-0108537, the entire disclosure of which is hereby incorporated by reference.

BACKGROUND OF THE INVENTION

1. Field of the Invention

The present invention relates to communication systems. More particularly, the present invention relates to a mobile device with a panel assembly for displaying images.

2. Description of the Related Art

Mobile devices provide a variety of functions and can perform composite operations according to the functions. Mobile devices may further include separate input units, such as keyboards or mouse devices, to assist users as they have to operate corresponding functions. However, the need to carry these separate units causes an inconvenience for the users. In order to resolve this problem, recent mobile devices are equipped with touch screens instead of keyboards or mouse devices.

A touch screen is configured as a panel assembly that includes a display panel for displaying images and a touch screen panel, installed to the display panel, for detecting a user's touches occurred thereon. Mobile devices with touch screens can detect user's touches and can perform corresponding functions, such as an image displaying function, etc., based on the detected touches.

However, such mobile devices are disadvantageous in that their touch screens may malfunction during the touch operations. For example, when a user's finger touches a particular position on the touch screen, a pooling phenomenon, showing a specific pattern, appears at a position spaced apart from the touched position on the touch screen. The pooling phenomenon may occur when the display panel and the touch panel contact each other according to the user's touch. In addition, the pooling phenomenon may also occur when friction is generated on the rear side of the display panel.

Therefore, a need exists for an improved apparatus for preventing a pooling phenomenon in a mobile device.

SUMMARY OF THE INVENTION

An aspect of the present invention is to address at least the above mentioned problems and/or disadvantages and to provide at least the advantages described below. Accordingly, an aspect of the present invention is to provide an improved apparatus for preventing a pooling phenomenon in a mobile device.

In accordance with an aspect of the present invention, a mobile device is provided. The mobile device includes a panel assembly for displaying images, the panel assembly forming an air chamber at its edge portion for filling with air, a cover window, mounted onto the panel assembly, for protecting the panel assembly and for detecting touches that occur thereon, and an adhesive tape for forming an open hole at a central portion to separate the cover window and the panel assembly, and for adhering the cover window to the edge portion of the panel assembly, wherein the adhesive tape comprises an air path part that provides an air passage for communicating the air chamber with the open hole via air.

In an exemplary implementation, the panel assembly includes a light guide plate for transmitting light to the cover window, a glass panel for showing the images via the light transmitted from the light guide plate, wherein the glass panel is located between the light guide plate and the cover window, and a panel suspension mounted to the lower side of the light guide plate, wherein ends of the panel suspension extend in the direction of the side of the light guide plate, so that the extended ends form the air chamber with the side of the glass panel.

In an exemplary implementation, the air path part includes at least one of an expanded hole for expanding the open hole in the adhesive tape or through-holes passing through the edge of the adhesive tape.

In an exemplary implementation, the mobile device may further include a panel bracket for allowing the placement of the panel suspension and for fixing the panel assembly therein. The panel bracket forms a separating groove in the middle area, and is spaced apart from the panel assembly via the separating groove.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 1:
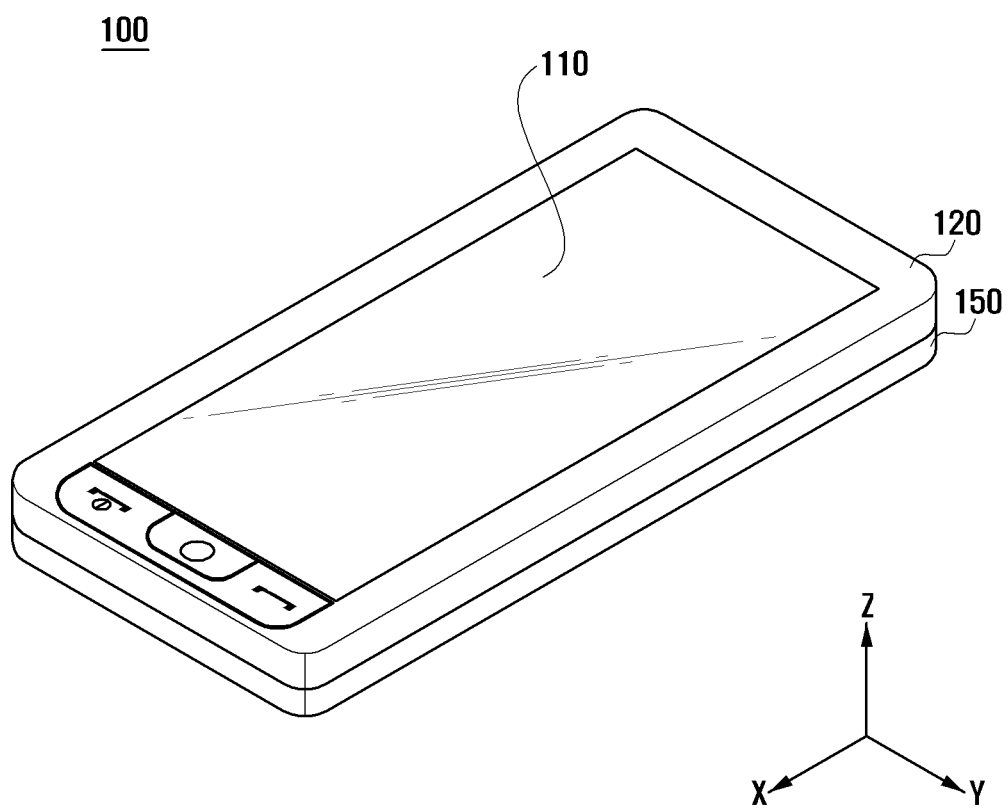
FIG. 1 illustrates a mobile device according to an exemplary embodiment of the present invention.
Figure 2:
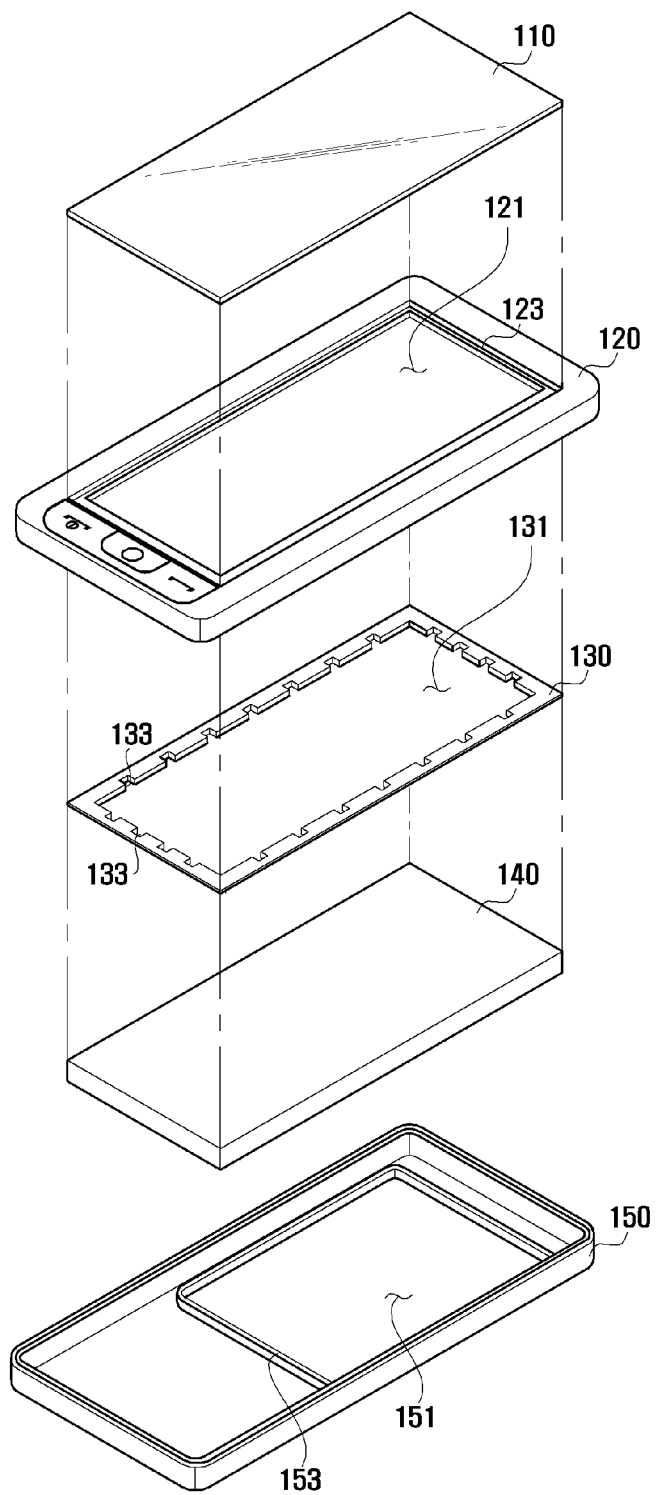
FIG. 2 illustrates an exploded perspective view of a mobile device according to an exemplary embodiment of the present invention.

FIG. 1 illustrates a mobile device according to an exemplary embodiment of the present invention. FIG. 2 illustrates an exploded perspective view of a mobile device according to an exemplary embodiment of the present invention.

Referring to FIGS. 1 and 2, a mobile device 100 includes a cover window 110, a cover chassis 120, an adhesive tape 130, a panel assembly 140 and a panel bracket 150.

The cover window 110 protects the components in the mobile device 100 and also detects a touch that occurs thereon. To this end, the cover window 110 is equipped with a touch panel and may be formed as a flat plate. Furthermore, the cover window 110 transmits internal light generated inside the mobile device 100 to the outside. Moreover, the cover window 110 can also transmit the external light incident thereon to the inside of the mobile device 100. In an exemplary implementation, the cover window 110 is made of materials that are excellent in terms of light transmission, heat-resistance, chemical resistance, mechanical strength, etc. For example, the cover window 110 may be implemented with a transparent film or glass plate made of polyethylene terephthalate, etc. The cover window 110 may also be implemented with a plastic plate made of polymethylmethacrylate, polyamide, polyimide, polypropylene, polyurethane, etc.

The cover chassis 120 also protects the components in the mobile device 100, together with the cover window 110. The cover chassis 120 is implemented in such a manner that it can protect the components of the mobile device 100 along at least one side of the mobile device 100. The cover chassis 120 may be made of synthetic resins. Alternatively, the cover chassis 120 may also be made of metal materials, such as stainless steel, titanium, or the like. The cover chassis 120 forms a receiving hole 121 to receive the cover window 110 in one direction. The receiving hole 121 is formed in such a manner that its edges protrude toward the center and serve as a stopper 123 allowing for the placement of the cover window 110. The stopper 123 holds the cover window 110 in the direction opposite to the direction where the cover window 110 is placed in the receiving hole 121.

The adhesive tape 130 joins the components of the mobile device 100 to the cover window 110 together, so that the cover window 110 can protect the components. The adhesive tape 130 is placed in the receiving hole 121 of the cover chassis 120, and adheres to the cover window 110. The adhesive tape 130 is shaped as a frame in the center of which an open hole 131 is formed. The adhesive tape 130 forms an air path part 133 along the edge of the open hole 131. The air path part 133 is formed as an uneven shape. That is, the air path part 133 includes a number of grooves to achieve the extension effect in the periphery of the open hole 131.

The panel assembly 140 is one of the components of the mobile device 100 and displays images. The panel assembly 140 is placed in the receiving hole 121 of the cover chassis 120 in the direction opposite to the direction where the cover window 110 is placed in the receiving hole 121. The panel assembly 140 is joined to the cover window 110 and also the cover chassis 120 by the adhesive tape 130. This configuration allows the panel assembly 140 to protect the cover window 110 and the cover chassis 120.

The panel assembly 140 is spaced apart from the cover window 110 by the open hole 131 and the air path part 133. That is, the open hole 131 forms a space between the cover window 110 and the panel assembly 140, in which air is filled. The space has a volume by the area by the open hole 131 and air path part 133 and the thickness of the adhesive tape 130. The configuration of the panel assembly 140 will be described in relation to FIGS. 3 and 4.

The panel bracket 150 fixes the components in the mobile device 100. The panel bracket 150 allows for the placement of the panel assembly 140 and then fixes it in place. The panel bracket 150 forms a separating groove 151 in the center portion of the region in which the panel assembly 140 is placed, where the region corresponds to the area of the panel assembly 140. The separating groove 151 forms a fix stopper 153 along its inner edge to fix the panel assembly 140. That is, the panel bracket 150 supports the panel assembly 140 via the fix stopper 153. The panel assembly 140 is spaced apart from the panel bracket 150 via the separating groove 151.

Furthermore, the panel bracket 150 also protects the components in the mobile device 100 together with the cover window 110 and cover chassis 120. The panel bracket 150 protects the components along at least one side of the mobile device 100. The panel bracket 150 forms an inner space as its edges are coupled to the cover chassis 120. That is, the panel assembly 140 is received and protected in the inner space formed by the cover window 110, cover chassis 120 and panel bracket 150.

Figure 3:
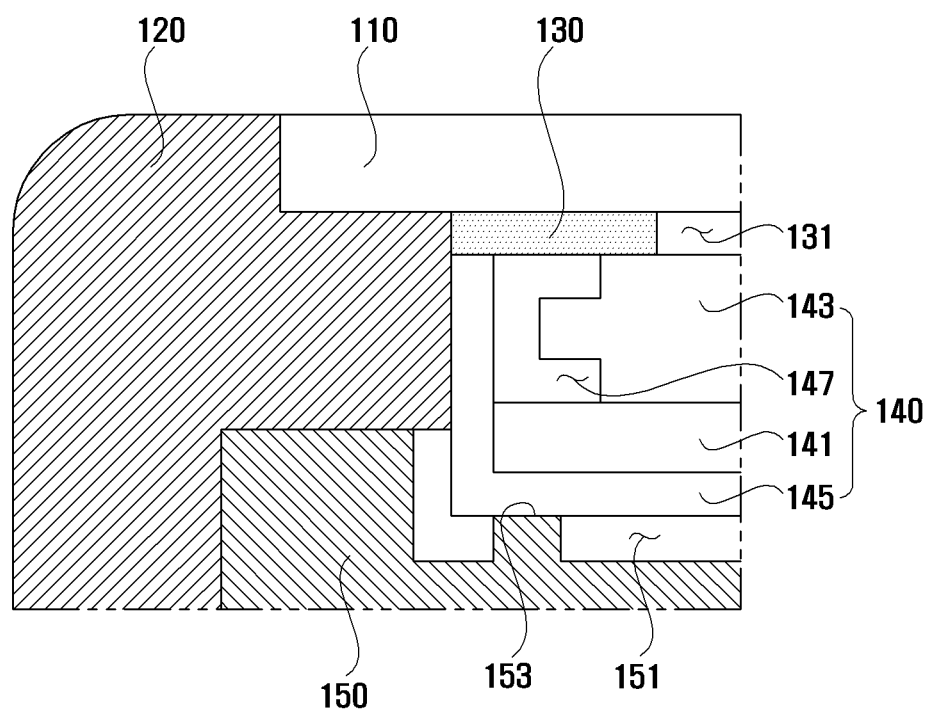
FIG. 3 illustrates a cross-sectional view of one part of a mobile device according to an exemplary embodiment of the present invention.
Figure 4:
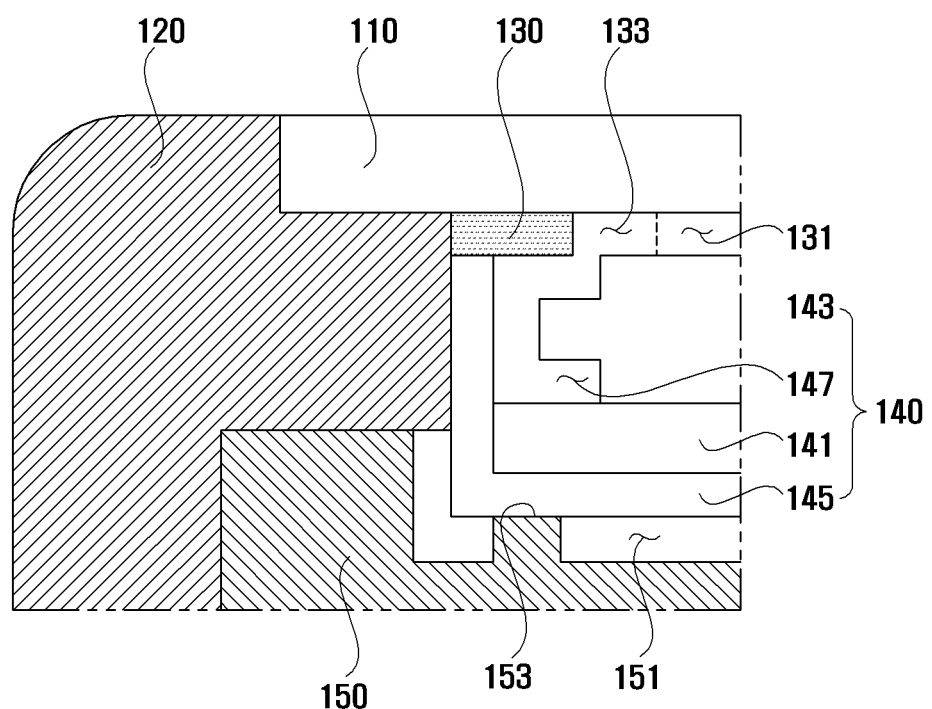
FIG. 4 illustrates a cross-sectional view of another part of a mobile device according to an exemplary embodiment of the present invention.

FIG. 3 illustrates a cross-sectional view of one portion of a mobile device according to an exemplary embodiment of the present invention. FIG. 4 illustrates a cross-sectional view of another portion of a mobile device according to an exemplary embodiment of the present invention. It is assumed that the cross-sectional views are based on the Y-Z plane in the X-Y-Z coordinate system shown in FIG. 1.

Referring to FIGS. 3 and 4, a panel assembly 140 includes a light guide plate 141, a glass panel 143 and a panel suspension 145.

The light guide plate 141 transmits inner light from a light source (not shown) to the cover window 110. The light guide plate 141 is made of a group of transparent plastic materials, such as acrylic, etc. In an exemplary embodiment of the present invention, the light source may be implemented with a light source or a point source. Examples of the light source are a Cold Cathode Fluorescent Lamp (CCFL), a Hot Fluorescent Lamp (HCFL), etc. Examples of a point source include a Light Emitting Diode (LED), etc.

The glass panel 143 is mounted onto the light guide plate 141. The glass panel 143 includes a display panel (not shown) that can display images using the internal light from the light guide plate 141. The display panel is implemented with a Liquid Crystal Display (LCD).

For example, a primary configuration of an LCD includes a Thin Film Transistor (TFT) substrate, a color filter and a Liquid Crystal (LC) placed therebetween. The material of the display panel is determined according to the types of LC. The TFT substrate alters the alignment of the LC to change the transmission of internal light from the light guide plate 141. The TFT substrate can create images by controlling the LC according to the transmitted internal light. The color filter reproduces colors via the internal light transmitted through the LC. To this end, the color filter includes a number of Red, Green, and Blue (RGB) pixels to show color lights.

The panel assembly 140 adheres to the cover window 110 via the adhesive tape 130, so the glass panel 143 is located between the cover window 110 and the light guide plate 141. The adhesive tape 130 is placed between the touch panel and the display panel, and adheres them to each other. In this case, the cover window 110 and the panel assembly 140 form the touch screen. The glass panel 143 may be small in size, compared with the light guide plate 141. Therefore, when the glass panel 143 is mounted onto the light guide plate 141, the light guide plate 141 protrudes more than the outmost edge of the glass panel 143 in at least one of x- and y- directions.

The panel suspension 145 is joined with the lower side of the light guide plate 141, and holds the light guide plate 141 and the glass panel 143. The panel suspension 145 is also extended from its end in a perpendicular direction so that its extension is located at the sides of the ends of the light guide plate 141 and the glass panel 143. The panel suspension 145 supplements the strength of the panel assembly 140.

The panel suspension 145 produces an air chamber 147 to the side of the glass panel 143. That is, as described above, the panel suspension 145 extends its end in the direction of the side of the glass panel 143, being spaced apart from the outmost end of the side of the glass panel 143, thereby providing the air chamber 147 between the extension and the side of the glass panel 143. The panel suspension 145 can expand the air chamber 147 with the light guide plate 141. That is, when the light guide plate 141 and the glass panel 143 are identical in width or length, the panel suspension 145 extends its end in the direction of the outmost end of the side of the light guide plate 141, so that the air chamber 147 can be expanded to the side of the light guide plate 141.

The panel suspension 145 adheres to the sides of the light guide plate 141 and glass panel 143 via the adhesive tape 130. In addition, the adhesive tape 130 contacts part of the edge of the glass panel 143. That is, part of the edge the glass panel 143 is exposed, corresponding to the air path part 133 of the adhesive tape 130. The air chamber 147 communicates with the open hole 131 via the air path part 133 of the adhesive tape 130. That is, the air path part 133 serves as an air passage between the air chamber 147 and the open hole 131. The panel suspension 145 is supported by the fix stopper 153 of the panel bracket 150 in such a manner that the portion of the panel suspension 145, approximately under the edge portion of the light guide plate 141, is placed on and held by the fix stopper 153. The middle area of the panel suspension 145 other than the edges is spaced apart from the panel bracket 150 via the separating groove 151 of the panel bracket 150.

When the mobile device user touches the panel assembly 140 via the cover window 110, air in the open hole 131 flows into and fills the air chamber 147 via the air path part 133, and then returns to the open hole 131. This prevents the open hole 131 from being in a vacuum state, between the cover window 110 and the panel assembly 140. That is, the air flow between the open hole 131 and the air chamber 147 according to a user's touch can prevent contact between the cover window 110 and the panel assembly 140, i.e., between the touch panel and the display panel. In addition, the separating groove 151 reduces the contact area between the panel suspension 145 and the panel bracket 150. This can prevent friction by the panel bracket 150 from being generated in the back side of the panel assembly 140 when the user touches the panel assembly 140 via the cover window 110. This function can avoid generating a pooling phenomenon in the mobile device 100 during operation of the mobile device 100 thereby avoiding malfunction of the mobile device 100.

Although exemplary embodiments of the present invention were described in such a manner that the air path part of the adhesive tape forms a groove, it should be understood that the exemplary embodiments of the present invention are not limited thereto. That is, the air path part of the adhesive tape may be implemented as a variety of shapes that can open the air chamber of the panel assembly. For example, the air path part can be shaped as through-holes passing through the adhesive tape along its edge. Alternatively, the air path part may be formed as a combination of an expanded hole that expands the open hole and though-holes passing through the adhesive tape.

As described above, since the mobile device according to exemplary embodiments of the present invention is configured in such a way that air in the open hole flows into and fills the air chamber via the air path part, according to the user's touch, and then returns to the open hole, direct contact between the cover window and the panel assembly, i.e., between the touch panel and the display panel, can be prevented. Therefore, the mobile device can display images without a pooling phenomenon, and reduce the chance of malfunction when the user touches the panel assembly via the cover window.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A mobile device comprising:
    a panel assembly for displaying images, the panel assembly forming an air chamber at its edge portion for filling with air;
    a cover window, mounted onto the panel assembly, for protecting the panel assembly and for detecting touches that occur thereon; and
    an adhesive tape for forming an open hole at a central portion to separate the cover window and the panel assembly, and for adhering the cover window to the edge portion of the panel assembly, wherein the adhesive tape comprises an air path part that provides an air passage for communicating the air chamber with the open hole.

2. The mobile device of claim 1, wherein the panel assembly comprises:
    a light guide plate for transmitting light to the cover window;
    a glass panel for showing the images via the light transmitted from the light guide plate, wherein the glass panel is located between the light guide plate and the cover window; and
    a panel suspension mounted to the lower side of the light guide plate, wherein ends of the panel suspension extend in the direction of the side of the light guide plate, so that the extended ends form the air chamber with the side of the glass panel.

3. The mobile device of claim 1, wherein the air path part comprises at least one of an expanded hole for expanding the open hole in the adhesive tape or through-holes passing through the edge of the adhesive tape.

4. The mobile device of claim 1, further comprising:
a panel bracket for allowing the placement of the panel suspension and for fixing the panel assembly therein,
wherein the panel bracket forms a separating groove in the middle area, and is spaced apart from the panel assembly via the separating groove.

5. The mobile device of claim 1, wherein the cover window comprises at least one of polyethylene terephthalate, polymethyl methacrylate, polyamide, polyimide, polypropylene, and polyurethane.

6. The mobile device of claim 1, further comprising:
a cover chassis forming a receiving hole to receive the cover window in one direction, wherein edges of the receiving hole protrude toward the center and serve as a stopper allowing for the placement of the cover window.

7. The mobile device of claim 6, wherein the adhesive tape is placed in the receiving hole of the cover chassis and adheres to the cover window.

8. The mobile device of claim 1, wherein when a user of the mobile device touches the panel assembly via the cover window, air in the open hole flows into and fills the air chamber via the air path part, and then returns to the open hole, to prevent contact between the cover window and the panel assembly.

* * * * *